(12) United States Patent
Chen

(10) Patent No.: US 7,597,641 B2
(45) Date of Patent: Oct. 6, 2009

(54) GEARING UNIT FOR POWER TRANSFERRING SYSTEM

(76) Inventor: Po-Lu Chen, No. 1117, Jhongshan Rd., Lujhu Township, Kaohsiung County 821 (TW)

( * ) Notice: Subject to any disclaimer, the term of this patent is extended or adjusted under 35 U.S.C. 154(b) by 343 days.

(21) Appl. No.: 11/645,170

(22) Filed: Dec. 26, 2006

(65) Prior Publication Data
US 2008/0153648 A1 Jun. 26, 2008

(51) Int. Cl.
*F16H 47/04* (2006.01)
(52) U.S. Cl. .......................... 475/83; 475/78
(58) Field of Classification Search ............. 475/1–3, 475/5, 7, 78–83; 74/458
See application file for complete search history.

(56) References Cited
U.S. PATENT DOCUMENTS

| | | | | |
|---|---|---|---|---|
| 3,301,093 A * | 1/1967 | Ewert | | 475/6 |
| 3,534,631 A * | 10/1970 | Keller | | 475/75 |
| 4,232,570 A * | 11/1980 | Gibson | | 477/68 |
| 4,526,060 A * | 7/1985 | Watanabe | | 475/4 |
| 5,667,452 A * | 9/1997 | Coutant | | 475/81 |
| 5,997,426 A * | 12/1999 | Ito et al. | | 475/80 |
| 6,379,276 B1 * | 4/2002 | Cheng | | 475/4 |
| 6,485,387 B1 * | 11/2002 | Goodnight et al. | | 475/76 |
| 6,692,395 B2 * | 2/2004 | Rodeghiero et al. | | 475/77 |
| 7,497,796 B2 * | 3/2009 | Ordo et al. | | 475/5 |

* cited by examiner

*Primary Examiner*—David D Le
*Assistant Examiner*—Justin Holmes
(74) *Attorney, Agent, or Firm*—Rosenberg, Klein & Lee

(57) ABSTRACT

A gearing unit of a power transferring system includes an input shaft, a hydraulic pump, a hydraulic motor, a worm rod and a worm wheel which is cooperated with a pair of planet gears. An output shaft is connected with the worm wheel to transfer torque so as to improve the initial speed, upward slope driving, gear shifting and braking of vehicles.

1 Claim, 5 Drawing Sheets

GEARING UNIT FOR POWER TRANSFERRING SYSTEM

FIELD OF THE INVENTION

The present invention relates to a gearing mechanism, and more particularly, to an improved clutch and gearing mechanism of a power transferring system for vehicles and mechanical machine.

BACKGROUND OF THE INVENTION

A conventional power transferring system for vehicle is shown in FIG. 1 and generally includes an engine 10*a*, a clutch 12*a*, a gearing and manual brake device 13*a*, a turbo compressor 16*a* and an air releasing valve for braking 17*a* which reduces the air supply to the engine and causes the un-complete combustion such that the compression force in the engine is used to brake the vehicle. The exhaust air is released via a catalyzer converter 18*a* and a muffler 19*a*.

In the conventional power transferring system, the engine receives extra air from the turbo and this is affected only when the revolution of the engine is at mediate level and is useless when the vehicle starts from stationary status or when the high gear is shifted to low gear. There are two types of operation of the gearing device and the first one is manual operation and the second one is automatic operation. When shifting by manual, the torque drops immediately and the torque cannot be increased immediately. The automatic operation uses a torque converter to cooperate with the acceleration valve to maintain the toque. However, the temperature of the engine oil is high in the engine and this cause low efficiency of transmission. The heavier the load is, the higher the heat lost is. The conventional braking system causes high temperature when the braking device is operated frequently such as when the vehicle goes on a downward slope road. The air releasing valve for braking 17*a* does not work at high gear position with low revolution. Besides, the in-complete combustion generates problems related to air pollution.

The present invention intends to provide a gearing unit of a power transferring system wherein the revolution of each gear of the gearing unit can be increased to its maximum revolution. When the acceleration pedal is pushed, the output shaft is affected. When the acceleration pedal is released, the engine brake feature is performed.

SUMMARY OF THE INVENTION

The present invention relates to a gearing unit of a power transferring system includes an input shaft, a hydraulic pump, a hydraulic motor, a worm rod and a worm wheel which is cooperated with a pair of planet gears. An output shaft is connected with the worm wheel to transfer torque.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
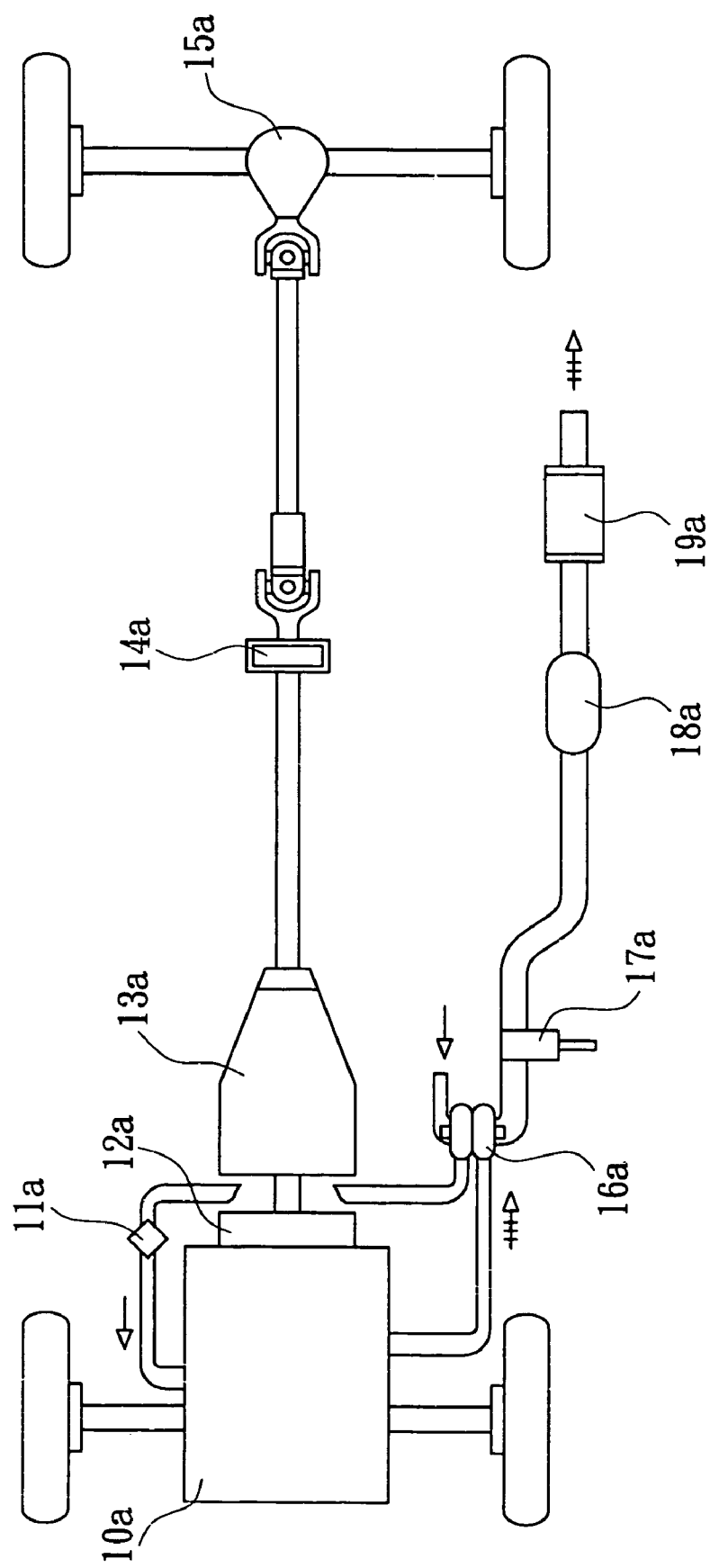
FIG. 1 shows a conventional power transferring system for vehicles.

Referring to FIGS. 2 to 5*c*, the first gearing unit 20 of the power transferring system of the present invention comprises a casing 31 in which an input shaft 21 is received and the input shaft 21 has a first end and a second end. The first end of the input shaft 21 extends out from the casing 31 so as to receive power, and the second end of the input shaft 21 is connected to an output shaft 42 which extends out from the casing 31.

A hydraulic pump 22 is located around the input shaft 21 and a hydraulic control valve 221 is connected to the hydraulic pump 22. The hydraulic control valve 221 communicates with a hydraulic hose 41 which is connected to an automatic control valve 40. The automatic control valve 40 is controlled by a control pedal 38 and a clutch pedal 39.

An oil tank 24 is connected to the hydraulic motor 26 and includes multiple passages 23. A hydraulic motor 26 is connected to the hydraulic pump 22 and located opposite the input shaft 21. At least one hydraulic pipe 25 is connected between the hydraulic motor 26 and the hydraulic pump 22. A worm rod 27 is connected to the hydraulic pump 26.

A rotatable ring gear 28 is located a side of the hydraulic pump 26 and opposite the hydraulic pump 22. The rotatable ring gear 28 is located around the input shaft 21. A fixed ring gear 29 is located on a side of the rotatable ring gear 28 and opposite the hydraulic motor 22. The fixed ring gear 29 is located around the input shaft 21.

A circular frame 30 is located between the rotatable ring gear 28 and the fixed ring gear 29, and the circular frame 30 is located around the input shaft 21. An output main gear 33 is located in the fixed ring gear 29 and located around the input shaft 21. A plurality of output planet gears 32 is located in the fixed ring gear 29 and located outside of the output main gear 33. An input main gear 35 is located in the rotatable ring gear 28 and located outside of the input shaft 21. An input planet gear 34 is located in the rotatable ring gear 28 and located around the input main gear 35. A worm wheel 36 is located between the rotatable ring gear 28 and the hydraulic pump 22. The worm wheel 36 is engaged with the worm rod 27.

Figure 2:
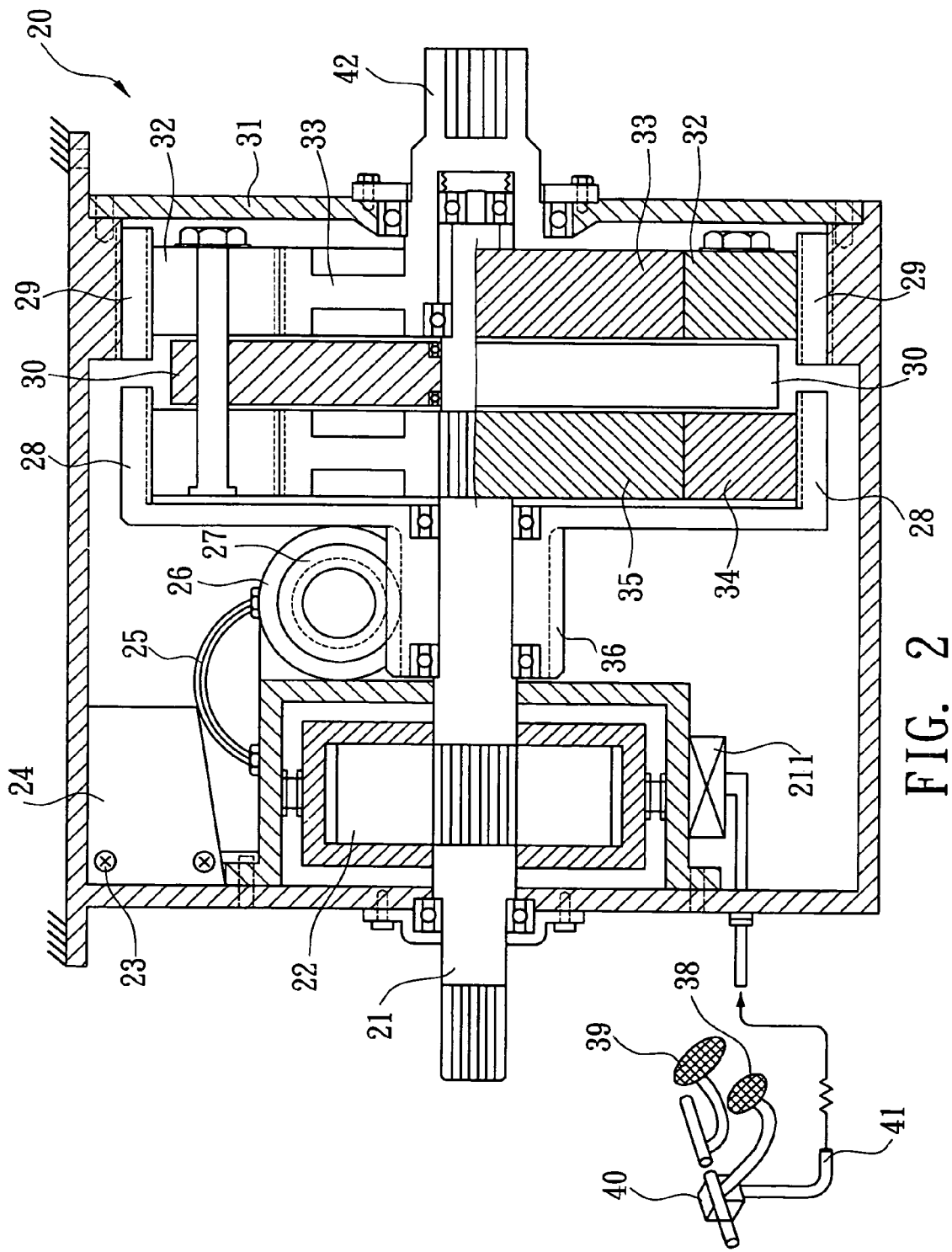
FIG. 2 is a cross sectional view of the gearing unit of the present invention.
Figure 3:
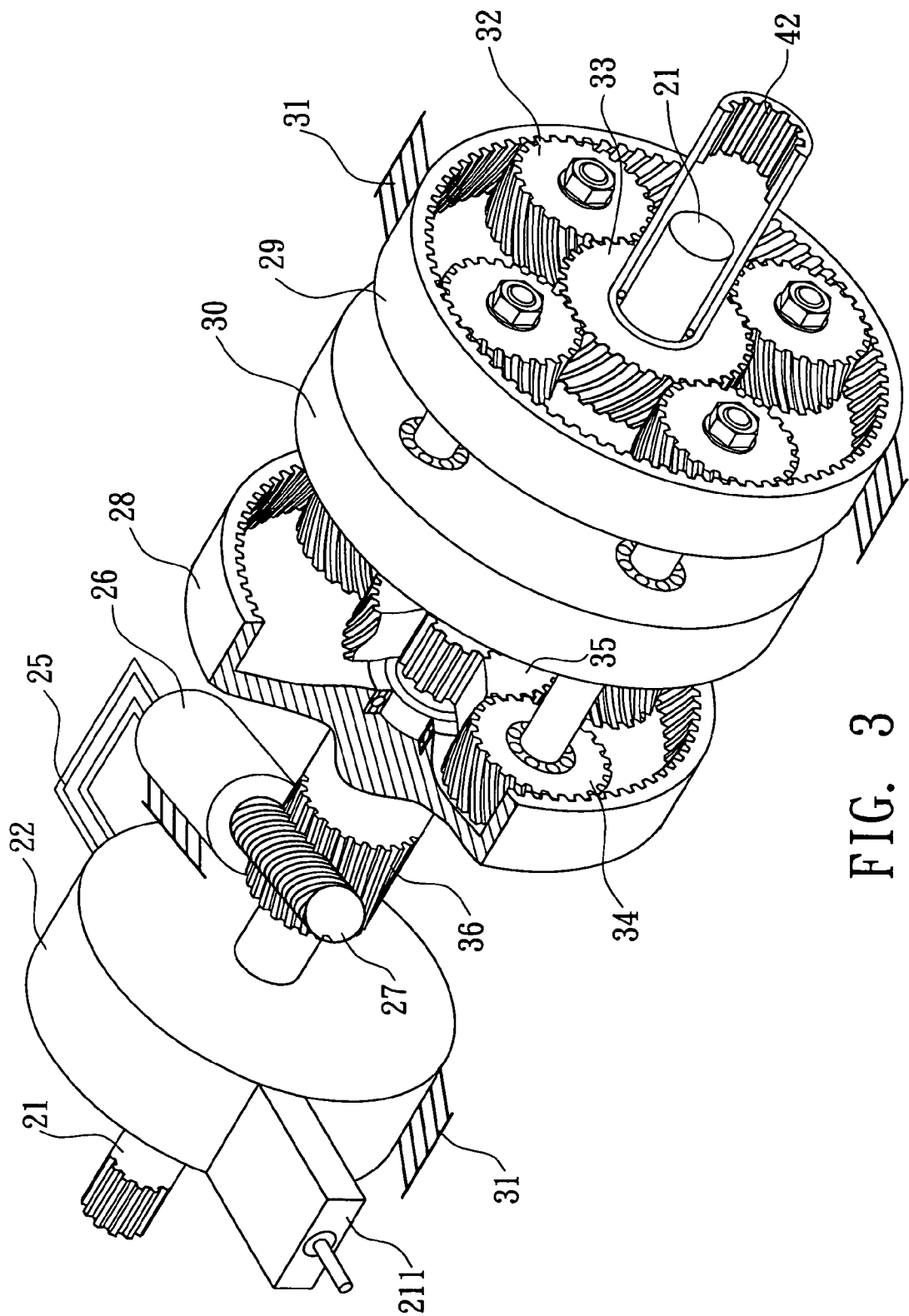
FIG. 3 is a perspective view of the gearing unit of the present invention.

The present invention allows the vehicle to immediately increase the maximum horse power after each shifting so as to avoid lack of torque after each shifting. By this way, the driver needs not to shift to a lower gear due to lack of torque. As shown in FIGS. 2 and 3, when the gearing device needs not to be changed, the output shaft 21 is assumed to be (+) and the hydraulic pump 22 is rotated in positive direction which does not affect the hydraulic oil thereof so that the hydraulic motor 26, the worm rod 27, the worm wheel 36 and the rotatable ring gear 28 are stationary. The input main gear 35 (+) drives the input planet gear 34 (−). Because the rotatable ring gear 28 is stationary, the circular frame 30 is forced to rotate in (+) direction and the output planet gear 32 is driven which is rotated in (−) direction due to the fixed ring gear 29. The output main gear 33 rotates in (+) direction and outputs from the output shaft 42 in (+) direction. Because the rotatable ring gear 28 and the stationary ring gear 29 are the same size, so that the input and the output of the system is the same.

When the gearing device needs to be changed, the pedal 38 is pushed and the valve 37 is activated so that the hydraulic pump 22 outputs hydraulic oil. The driver controls the pedal 38 to control the volume of the hydraulic oil sent to the hydraulic motor 26 to control the revolution of the worm rod 27. This makes the rotatable ring gear 28(−) to generated controllable rotation in reverse direction. In the meanwhile, both the output shaft 42 and the output main gear 33 (+) rotate in (+) direction, and drive the output planet gear (−), the circular frame 30, the input planet gear 34 (−), the input main gear 35 (+) and the output shaft 21(+) to drive the engine. It is noted that the rotatable ring gear 28 (−) drives the input planet gear 34 (−) in the reverse direction to accelerate the speed of the input planet gear 34 more quickly in (−) direction, the input main gear 35 (+) accelerates in (+) direction. Therefore, the resistance in the engine is small so that the engine can be operated at high speed. Because the input planet gear 34 is a free gear which does not affect the revolution of the circular frame 30 (+). When the engine is accelerated to its maximum revolution, the driver releases the pedal 38 gradually to slow down the rotatable ring gear 28 which makes the input planet gear 34 exert a force in (+) direction to the input main gear 35 and the circular frame 30 (+) rotates faster to quickly accelerate the vehicle. The rotatable ring gear 28 is forced to rotate in (−) direction so that the worm wheel (36) and the worm rod 27 can be activated simply by releasing the friction force therebetween. Therefore, the engine is able to randomly increase its output to maximum horse power in any gearing. The fuction can also be used in automatic gear shifting engine without using a torque converter.

Figure 5A:
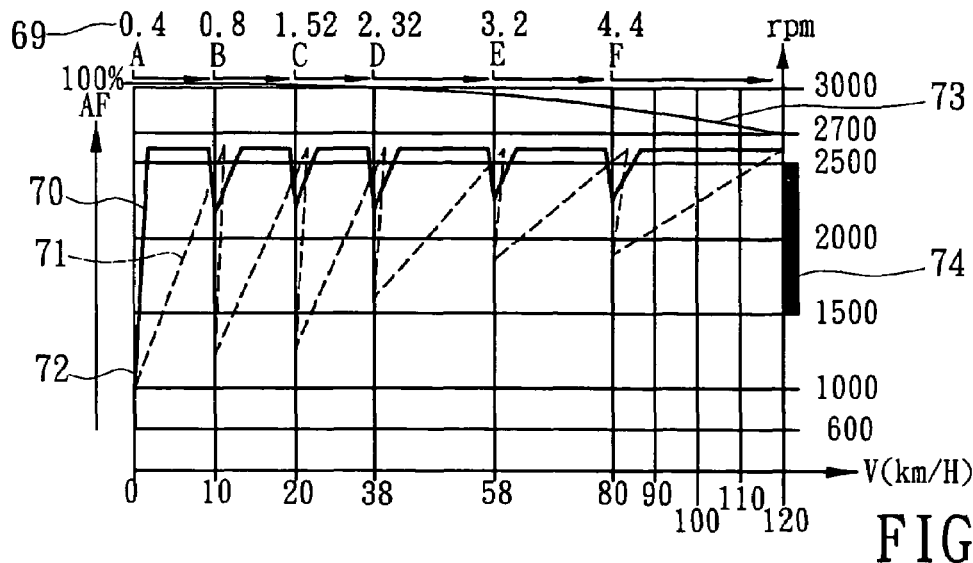
FIG. 5*a* is a diagram to disclose the optimized revolution line of the power transferring system of the present invention, the revolution line of the conventional power transferring system, the optimized section of the clutch, the interruption line of the static wind speed, and the optimized combustion zone.
Figure 5B:
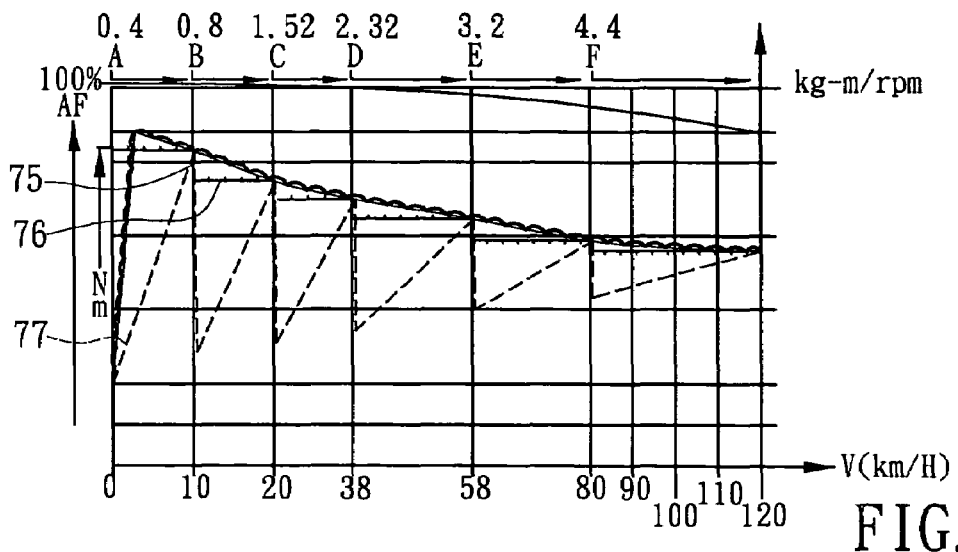
FIG. 5*b* shows the maximum torque line, gear ratio of the present invention and the maximum torque line after gear shifting of the conventional power transferring system.
Figure 5C:
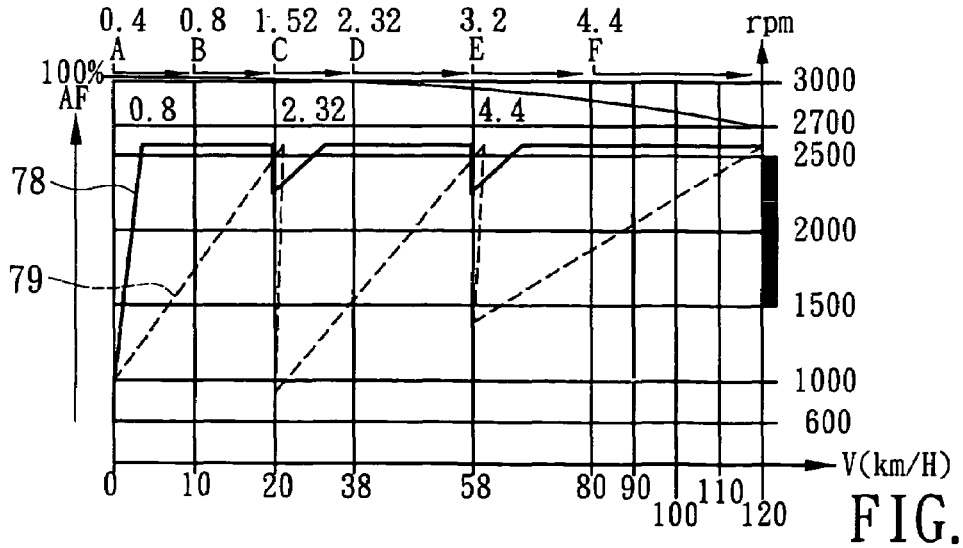
FIG. 5*c* shows that the power transferring system is operated at gear three and operation of the conventional power transferring system at gear three.

Referring to FIG. 5a which shows the optimized revolution line 70 of the power transferring system of the present invention, the revolution line of the conventional power transferring system, the optimized section 72 of the clutch, the interruption line 73 of the static wind speed, and the optimized combustion zone 74. FIG. 5b shows the maximum torque line 75, the gear ratio 76 of the present invention and the maximum torque line 77 after gear shifting of the conventional power transferring system. FIG. 5c shows that the operation line 78 of the power transferring system operated at gear three and operation line 79 of the conventional power transferring system at gear three.

The related speed of the input main gear 35, the circular frame 30 and the rotatable and fixed ring gears are disclosed as follows:

If the rotatable ring gear 28 is not rotated, the revolution (+) of the input main gear 35=(the number of the ring gear 28/(the number of teeth of the input main gear 35+1)×the number of revolutions (+) of the circular frame 30.

If the circular frame 30 is not rotated, the revolution (+) of the input main gear 35=(the number of the ring gear 28/the number of teeth of the input main gear 35)×the number of revolutions (−) of the ring gear 28.

If the circular frame 30 is not rotated, the revolution (+) of the ring gear 28=(the number of teeth of the input main gear 35/the number of the ring gear 28+1)×the number of revolutions (+) of the circular frame 30.

Figure 4:
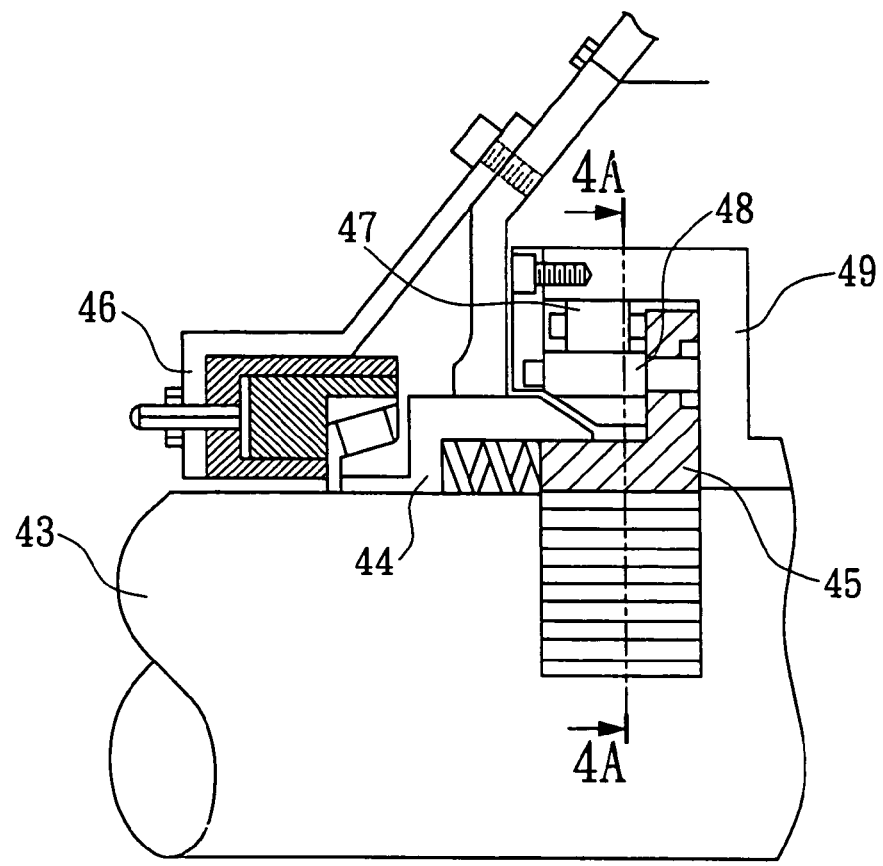
FIG. 4 shows a cross sectional view of the second gearing unit of the present invention.
Figure 4A:
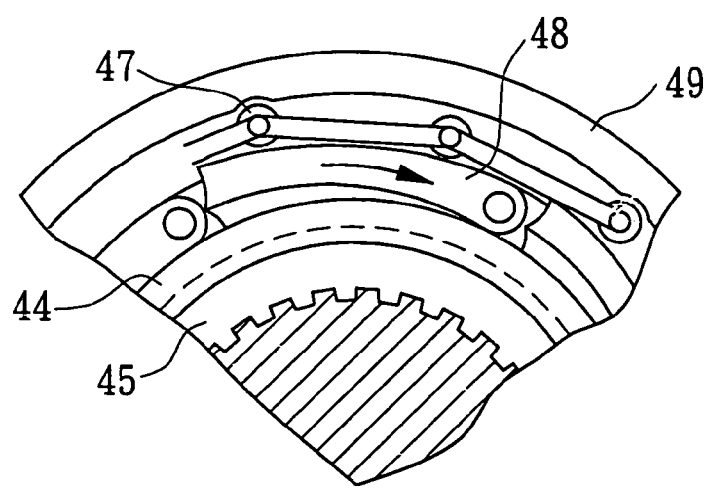
FIG. 4A shows a cross sectional view along line 4A-4A in FIG. 4.

As shown in FIGS. 4 and 4A, which show a second gearing unit "A" which includes a second input shaft 43 which is assumed to rotated in (+) direction, a active wheel 45 which is connected to the second input shaft 43 so as to drive a cam disk 48 which is rotated with the second input shaft 43. At least one roller 47 is located between the cam disk 48 and the passive shaft 49. When the hydraulic tank 46 is activated by hydraulic oil from the braking action by the driver, the hydraulic tank 46 drives a slide 44 to push the cam disk 48 upward so as to move the at least one roller 47 to be engaged with a recess in the passive shaft 49, such that the passive shaft 49 is rotated in (+) direction. A detection device is used to monitor the speed, the temperature and vibration of the second gearing unit "A".

While we have shown and described the embodiment in accordance with the present invention, it should be clear to those skilled in the art that further embodiments may be made without departing from the scope of the present invention.

What is claimed is:

1. A gearing unit (20) comprising:

a casing (31);

an input shaft (21) having a first end and a second end, the first end of the input shaft (21) extending out from the casing (31) and adapted to receive power, the second end of the input shaft (21) connected to an output shaft (42) which extends out from the casing (31);

a hydraulic pump (22) located around the input shaft (21) and a hydraulic control valve (221) connected to the hydraulic pump (22), the hydraulic control valve (221) communicating with a hydraulic hose (41) which is connected to an automatic control valve (40), the automatic control valve (40) being controlled by a control pedal (38) and a clutch pedal (39);

an oil tank (24) connected to the hydraulic motor (26) and including multiple passages (23);

a hydraulic motor (26) connected to the hydraulic pump (22) and located opposite the input shaft (21), at least one hydraulic pipe (25) connected between the hydraulic motor (26) and the hydraulic pump (22), a worm rod (27) connected to the hydraulic pump (26);

a rotatable ring gear (28) located a side of the hydraulic pump (26) and opposite the hydraulic pump (22), the rotatable ring gear (28) located around the input shaft (21);

a fixed ring gear (29) located on a side of the rotatable ring gear (28) and opposite the hydraulic motor (22), the fixed ring gear (29) located around the input shaft (21);

a circular frame (30) located between the rotatable ring gear (28) and the fixed ring gear (29), the circular frame (30) located around the input shaft (21);

an output main gear (33) located in the fixed ring gear (29) and located around the input shaft (21);

a plurality of output planet gears (32) located in the fixed ring gear (29) and located outside of the output main gear (33);

an input main gear (35) located in the rotatable ring gear (28) and located outside of the input shaft (21);

an input planet gear (34) located in the rotatable ring gear (28) and located around the input main gear (35), and a worm wheel (36) located between the rotatable ring gear (28) and the hydraulic pump (22), the worm wheel (36) engaged with the worm rod (27).

* * * * *